E. FRIEDERICH.
INCLOSED ARC DEVICE AND THE METHOD OF STARTING THE SAME.
APPLICATION FILED OCT. 13, 1914.

1,393,520. Patented Oct. 11, 1921.
2 SHEETS—SHEET 1.

Witnesses
Anthony Mart
J. Ellis Glen

Inventor
Ernst Friederich
by Allen S. Davis
His Attorney

UNITED STATES PATENT OFFICE.

ERNST FRIEDERICH, OF BERLIN, GERMANY, ASSIGNOR TO GENERAL ELECTRIC COMPANY, A CORPORATION OF NEW YORK.

INCLOSED ARC DEVICE AND THE METHOD OF STARTING THE SAME.

1,393,520.   Specification of Letters Patent.   Patented Oct. 11, 1921.

Application filed October 13, 1914. Serial No. 866,438.

*To all whom it may concern:*

Be it known that I, ERNST FRIEDERICH, a subject of the King of Prussia, residing at Berlin, Germany, have invented certain new and useful Improvements in Inclosed Arc Devices and the Methods of Starting the Same, of which the following is a specification.

The present invention comprises a device in which an arc is operated in an inclosed envelop between electrodes of refractory material, such, for example, as tungsten, in an indifferent atmosphere, the electrodes being proportioned to be heated to incandescence. It is one of the features of my invention to operate the arc in an envelope of vapor which will render the arc luminous, for example, mercury vapor, at relatively considerable pressure, preferably approximating atmospheric pressure.

Another feature of my invention, comprises a lamp in which the series resistance required for steadying the arc is also operated at incandescence in the inclosing envelop and contributes light, thereby still further increasing the efficiency of the lamp and also improving the color of the light.

Other features of my invention comprise various means for heating one or more of the electrodes preliminary to and for the purpose of starting the arc.

Figure 1:
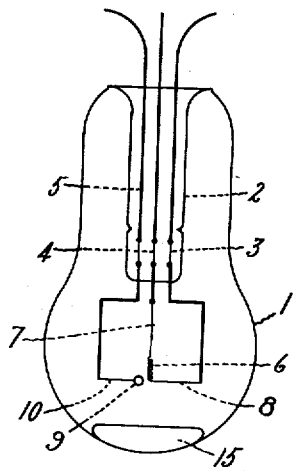
Figure 14:
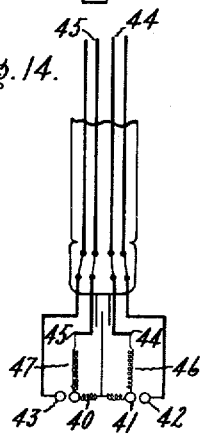
Figure 15:
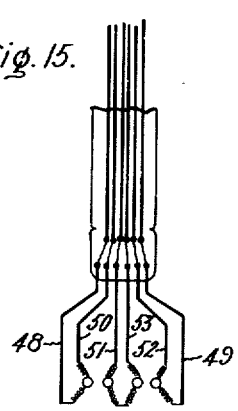

The above and various other aspects of my invention are pointed out in the appended claims and will be better understood from the following description taken in connection with the accompanying drawings, of which Figure 1 shows somewhat diagrammatically a simple form of direct current arc lamp embodying my invention; Figs. 2 to 7 are modifications; Figs. 8 to 11 illustrate a lamp in which a heated electrode distinct from the main electrodes is used to start the arc; Figs. 12 and 13 also show lamps in which the steadying resistance is used as a light source; Figs. 14 and 15 illustrate particular arrangements for operating a plurality of arcs in the same envelop, and Figs. 16 to 19 illustrate diagrammatically circuit connections for starting the lamp.

As shown in Fig. 1, the lamp consists of an inclosing globe or container 1 provided as usual with a stem 2 into which are sealed leading in conductors 3, 4 and 5. The electrodes in the simplest type of lamp shown in Figs. 1 to 7, inclusive, include an electrode 6 consisting of tungsten, or other suitable material having an electron emissivity great enough to support an arc-like discharge at a temperature at which the electrode remains substantially intact or unvaporized, preferably closely coiled to reduce the cooling effect of the gas, and having its terminals 7, 8 joined in turn to leading-in wires 3, 4. Heating current is supplied thereby to initially heat the electrode 6. This heating current may be furnished by a separate source of energy of suitable voltage, or by the main source of energy for operating the lamp, in which case the coil 6 is preferably connected in series with a suitable external or internal resistance, as will be hereinafter explained in connection with some of the other figures.

Figure 2:
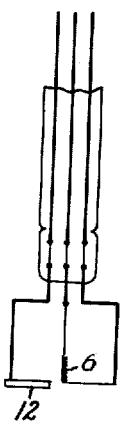
Figure 3:
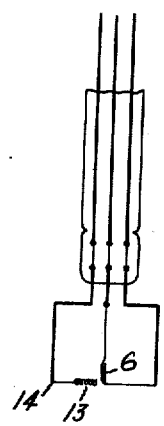

The coöperating electrode 9 may consist either of a small metallic globule attached mechanically or by welding to a conductor 10 of smaller cross-section, or, as shown in Fig. 2, may consist of a small rod 12 of metal, or, as shown in Fig. 3, it may consist of a closely coiled spiral 13 attached at one end only to a terminal conductor 14.

The envelop 1 is filled with a gas inert with respect to the metal constituting the electrodes. Various indifferent gases, such as nitrogen, argon, or a mixture of these gases, may be used for this purpose, but preferably I employ a vapor, for example, a metal vapor, such as mercury, which renders the arc luminous. In indifferent fixed gases, such as nitrogen or argon, the arc voltage is relatively low, for example, with a slight separation of the electrodes in a lamp filled with an atmosphere of nitrogen having an efficiency of about one-half watt per candle power, an arc may be sustained with an impressed potential of about 50 volts, and under similar conditions in an argon atmosphere an arc may be sustained at about 15 to 20 volts. When using a filling of mercury vapor, furnished, for example, by a globule of metallic mercury 15, there is preferably also present an indifferent gas, such as nitrogen, at relatively low pressure. The mercury filling should be sufficient in amount to give when vaporized a pressure of at least several millimeters of mercury.

The pressure of the gaseous filling preferably is so chosen that at the operating temperature of the lamp, the gaseous pressure is of the order of magnitude of one atmosphere. In the same manner when using a mercury filling, the lamp should be so proportioned as to operate at a temperature at which the vaporized mercury will have a pressure of the order of magnitude of one atmosphere. In some cases, however, the desirable characteristics of the arc may be obtained at lower pressures, at which the arc starts at a lower voltage. The gaseous atmosphere suppresses the electrical disintegration of the cathode which would otherwise occur.

Instead of mercury, other vapors or gases which impart luminosity to the arc may be used, for example, neon, or vaporized salts, for example, chlorid of thallium (chlorür) or aluminum chlorid, either alone, or mixed with one another or with indifferent gases. Oxids such as calcium oxid and magnesium oxid may be placed in the neighborhood of the arc and assist in the production of light either in the solid or vaporized state. Oxids, such for example, as magnesium oxid, aluminum oxid, zirconium oxid and thorium oxid may be admixed with the tungsten constituting the electrodes.

The particular configuration of the electrodes may be varied as desired, but they preferably should be of such dimensions and the connecting conductor should be so proportioned at the point of union with the electrodes that the electrodes will operate at a temperature at which the efficiency of light production by incandescence is higher than at the temperature at which said electrodes could be operated with some useful life in a vacuum. As the efficiency increases very rapidly with the temperature, a net gain of efficiency may be obtained by operating at higher temperature in an inert gas even though heat is lost by gas convection currents.

Globular electrodes may be made by melting ductile tungsten wires, or pressed filament in an arc. The electrodes may also be made by pressing tungsten, or other powder, into desired form and then sintering. Experiments have shown that the diameter of the globules should be about ten times the diameter of the stem. As compared with the stem, the globule has a greater cubical content for its surface. By thus crowding the source of light into a small space, the heat losses to the surrounding gas are materially reduced. Similarly spirals act, as far as heat losses are concerned, like cylinders of the same size.

Figure 4:
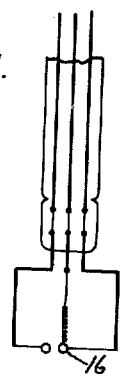
Figure 5:
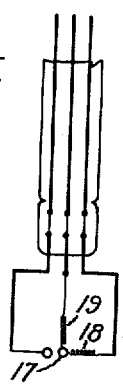

In some cases it is preferable to provide the initially heated electrode 6 with a thickened portion or with a globule of metal similar in shape to the coöperating electrode, as shown at 16 in Fig. 4, to prevent over-heating of the spiral conductor. In some cases this small metal button or globule can to advantage be attached to an angle in the heated conductor mechanically or by welding, as shown at 17 in Fig. 5. With such a construction, part of the heated conductor, for example, section 18 operates in series with section 19 only during the starting of the lamp and enables the full working voltage to be employed for starting. During the operation of the arc, section 18 is cut out, section 19 operates in series with the arc and acts as a ballast resistance, thus adding to the efficiency of the lamp, as it may be operated at intense incandescence in an atmosphere of inert gas. The color of the light given by section 19 and the color of the arc can be advantageously made the complement of each other.

The lamps described in connection with Figs. 1 to 5 can be operated on alternating current by first making suitable connections to bring the spiral electrode 6 to incandescence and then applying potential between electrode 6 and the coöperating electrode, for example, electrode 9, Fig. 1. but when direct current is used, care must be exercised to make the heated electrode 6 the cathode.

Figure 16:
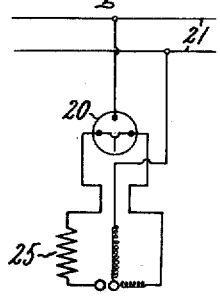
Figure 17:
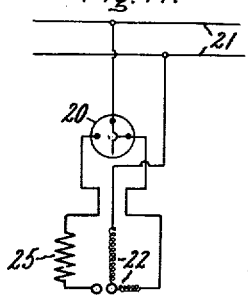
Figure 18:
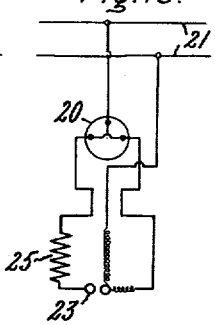
Figure 19:
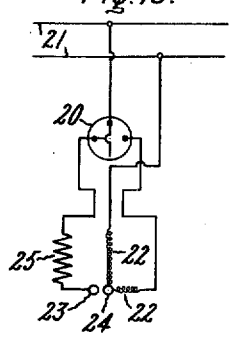

One method of starting the lamp is shown in detail by Figs. 16 to 19, inclusive. In Fig. 16, the three-point switch 20 is the off position. As shown in Fig. 17, it first completes a circuit from conductors 21 through the coiled wire 22. When the coil 22 has been brought to bright incandescence, the switch 20 is turned, as shown in Fig. 18 to connect the coöperating electrode 23 to the positive terminal of the energy supply. As shown in Fig. 19, the next turn of the switch opens the circuit from the current supply through the heated spiral 22 so that an arc springs between the separated electrodes 23 and 24, making the electrode 24 the cathode. It is often advantageous to heat the cathode to a higher temperature at starting than it is heated when the arc is operating, thereby making starting easier.

In Figs. 16 to 19 a separate series resistance 25 is shown in circuit with the electrode 23, but this is unnecessary if the section of the heated electrode operating in series with the arc is suitably proportioned to act as a steadying resistance.

Figure 6:
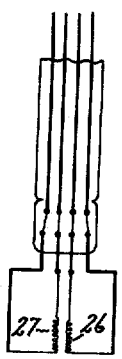
Figure 7:
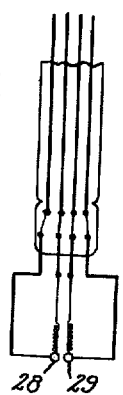

The necessity of carefully making the heating electrode the cathode and operating the lamp with direct current makes it desirable in some cases to adapt both electrodes to be heated externally, as shown in Figs. 6 and 7, in which both electrodes 26 and 27, Fig. 6, consist of short heavy spirals of tungsten wire. Of course, in this case thickened portions or globules 28, 29, Fig. 7, may also be provided located at a shorter distance to each other than the rest of the electrodes so that the arc will have its seat at the thickened portions.

Figure 8:
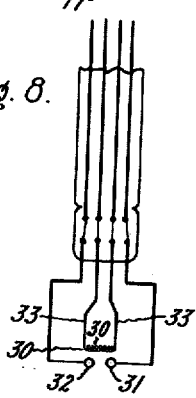
Figure 9:
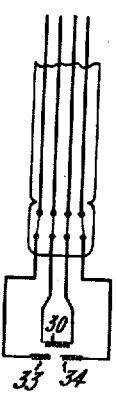
Figure 10:
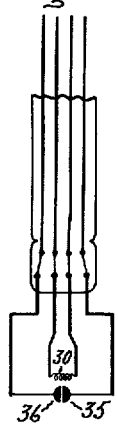
Figure 11:
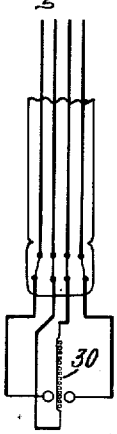
Figure 12:
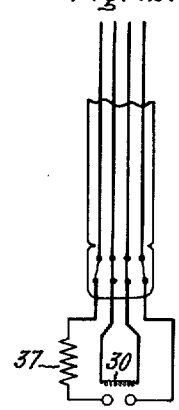
Figure 13:
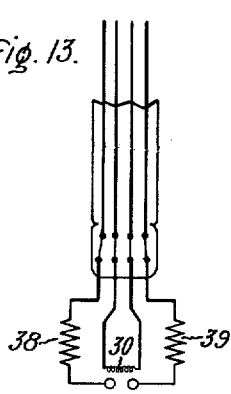

In Figs. 8 to 13, inclusive, various arrangements have been shown in which a heated electrode distinct from the main working electrodes is employed for starting the lamp, this electrode being subsequently cut out of circuit. In the modifications illustrated the electrode constituting the main cathode may be termed an open-circuit electrode as distinguished from the closed circuit auxiliary or starting electrode 30. As shown in Fig. 8, the starting electrode 30 consists of a closely wound spiral similar in construction to the electrode 3, Fig. 1, and located about the same distance from the working electrodes 31, 32, as these electrodes are separated from each other. A heating current is first passed by means of conductors 33 through the spiral 30 and voltage suitable for sustaining an arc is impressed between electrode 30 as cathode and electrode 31 as anode. When electrode 31 has reached bright incandescence, the polarity is reversed so as to make the electrode 31 negative. As the globular electrode 31 has been heated by the arc, it can operate as a cathode. The electrode 32 then is connected to the positive terminal of the energy supply so that when the electrode 30 is disconnected, the arc will spring to the electrode 32 and continue to operate. The construction of Fig. 9 is similar to that already described, except for the shape of the main electrodes 33, 34, which are closely wound spirals similar to the electrode 13, Fig. 3. The main working electrodes 35, 36 in Fig. 10 are shaped hemispherically so that a very short arc may be operated between them. Although for the sake of clearness, the heated electrode 30 of Figs. 8 to 10 has been shown above both the main working electrodes, it may likewise be located in other positions, such as shown in Fig. 11, in which it is positioned vertically. It may also to advantage be located under the arcing electrodes.

The heater wire preferably is so proportioned that the entire voltage utilized in the operation of the lamp can be consumed by the same immediately when switching in the lamp. Thereby an external series resistance otherwise necessary is eliminated. In order to minimize the shock of the initial current through the heater wire, only the part of the heater wire 30 acting directly as electrode may be made of tungsten, the remainder may consist of metal with a smaller temperature coefficient or still better of material with a negative temperature resistance coefficient as carbon or boron. The heating current may be decreased by constituting the heater wire an oxid cathode, for example, as a spiraled or stranded wire, between the turns of which, oxids, such as calcium oxid, has been placed.

When using a starting electrode which is cut out during the operation of the lamp, it is necessary to operate a separate resistance in series with the arc in order to steady the same. This resistance is preferably for the sake of increased efficiency located within the lamp envelop as already described in connection with Fig. 5. In Fig. 12, the resistance 37 has been shown located in series with one electrode and in Fig. 13 two resistances 38, 39 have been shown in series respectively with the two electrodes for the sake of symmetry. The resistances preferably consist of tungsten and are proportioned to operate at a high efficiency. The efficiency and color of the light are thereby improved.

In some cases it is desirable to operate a plurality of arcs in a single envelop, for example, when it is desirable to use higher operating voltages or higher operating currents. In the former case the arcs are operated in series and the latter in parallel. In Fig. 14 an arrangement is shown in which there are provided two heated electrodes 40, 41. Two unheated electrodes 42, 43 are located respectively adjacent to said unheated electrodes. A heating current is first passed by means of conductors 44, 45 through the spirals 46, 47 in series and then the arcs are started by a current of suitable potential between electrodes 41, 42 and 40, 43 respectively in a manner already described in connection with the other figures.

In Fig. 15 each of the electrodes is adapted to be heated, the conductors 48, 49 being initially connected to the terminals of the energy supply and the conductors 50, 51 and 52, 53 respectively connected to each other. When thus the entire length of spiral is heated to incandescence, the connections between the conductors 50 and 51 and also between conductors 52 and 53 are successively opened, thereby starting the arcs.

Some of the advantages to be gained with a lamp made as above described are high efficiencies ranging from ½ to ¼ watts per candle, the possibility of making high efficiency lamps of low candle power and as contrasted with other arc lamps steadiness of light, absence of regulating mechanism and the fact that no tending or trimming is required.

What I claim as new, and desire to secure by Letters Patent of the United States, is:—

1. An electric arc device comprising a sealed container, a cathode of tungsten therein operating at incandescence, a coöperating anode, terminal conductors for said electrodes, and a filling of material inert with respect to the electrodes during the operation of the device and having at the operating temperature a pressure high enough to give an electric discharge the characteristics of an electric arc.

2. An electric arc lamp, comprising a sealed container, electrodes of tungsten therein operable at incandescence, terminal conductors therefor, and a filling of vaporizable material which is gaseous at the operating temperature of the lamp, inert with respect to the electrodes and imparting luminosity to an arc between said electrodes, said material being sufficient in amount to constitute at the operating temperature of the lamp a gaseous envelop about said electrodes, having a pressure high enough to give an electric discharge between said electrodes the characteristics of an electric arc.

3. An electric arc lamp comprising a sealed container, tungsten electrodes therein operable at incandescence, terminal conductors therefor, and a quantity of mercury sufficient in amount to furnish at the operating temperature of the lamp an envelop of mercury vapor about said electrodes, having a pressure high enough to give an electric discharge between said electrodes the characteristics of an electric arc.

4. An electric arc lamp, comprising a container, tungsten electrodes therein adapted to operate at incandescence, terminal conductors therefor, a filling of gas inert with respect to said electrodes, and a substantial quantity of vaporizable material imparting luminosity to an arc between said electrodes.

5. An electric arc lamp, comprising a container, tungsten electrodes therein adapted to operate at incandescence, terminal conductors therefor, a filling of argon gas and a substantial quantity of mercury.

6. An electric arc device comprising a sealed container, a cathode of a material adapted to support by incandescence an arc-like discharge at a temperature at which said cathode remains substantially intact, a coöperating anode, terminal conductors for said electrodes and a filling of material having at the operating temperature a pressure high enough to cause an electric discharge between said electrodes to have the characteristics of an electric arc.

7. An electric arc device comprising a sealed container, a refractory cathode of a material adapted to support by incandescence an arc discharge at a temperature at which said cathode remains substantially intact, a coöperating anode, terminal conductors for said electrodes of substantially smaller cross-section than the electrodes, and a filling of a material having at the operating temperature a pressure of the order of magnitude of atmospheric pressure and imparting luminosity to a discharge therein.

8. An electric arc device comprising a sealed container, a cathode of refractory material adapted to support at incandescence an arc discharge while remaining substantially intact, a coöperating anode, a filling of material having at the operating temperature a gaseous pressure of the order of magnitude of atmospheric pressure, and means for independently heating the cathode to incandescence.

9. An electric arc device comprising a sealed container, a cathode of tungsten of concentrated mass, a cathode stem of materially smaller cross-section than said cathode, a coöperating anode adjacent said cathode, and a filling of gas substantially inert chemically with respect to said cathode when at incandescence and having at the operating temperature a pressure enabling an arc discharge to occur at an impressed voltage of about 15 to 50 volts while said cathode is at incandescence.

10. An electric lamp comprising the combination of an envelop, electrodes of refractory material proportioned to be heated to incandescence by an arc passing between said electrodes, a material in said envelop imparting luminosity to an arc and having a relatively high vapor pressure at the working temperature of said device, and a refractory conductor located in said envelop connected in series with said arc and being proportioned to be heated by the arc-sustaining current to a temperature at which the cooling effect of the vapor is more than off-set by the increased efficiency of light emission.

11. An electric lamp comprising an envelop, arc-sustaining electrodes, a substance in said envelop having at the operating temperature of said lamp a substantial pressure, and a filament of refractory material located within said envelop and connected in series with said electrodes, said filament being proportioned to be heated by the arc-sustaining current to incandescence.

12. The combination of an inclosing envelop, arc sustaining tungsten electrodes, a supply of mercury for carrying when vaporized current between said electrodes, a refractory conductor having a resistance sufficient to steady said arc and being proportioned to be heated to incandescence by the arc current, and series connections between said conductor and said arc-sustaining electrodes.

13. An electric lamp comprising the combination of an envelop, electrodes of tungsten therein separated by a gap, said electrodes being proportioned to operate at incandescence when an arc is formed across said gap, a supply of vapor having a pressure approximating the pressure of the atmosphere, imparting luminosity to an arc passing therein, and a refractory conductor connected in series with said arc and being proportioned to have at incandescence a resistance sufficient to steady said arc.

14. An electric arc device comprising a sealed container, a cathode comprising a closely coiled wire of refractory material adapted to support at incandescence an arc discharge while remaining substantially intact, an anode, a filling of material having at the operating temperature a pressure of the order of magnitude of atmospheric pressure, and means for independently heating said cathode to incandescence.

15. An electric arc device comprising a sealed container, a plurality of electrodes therein consisting of material adapted to be operated at incandescence while remaining substantially intact and arranged to enable a plurality of arcs to be operated in series between said electrodes and a filling of material in said container having at the operating temperature of the lamp a gaseous pressure of the order of one atmosphere.

16. The combination of an electric device comprising a sealed container, electrodes therein arranged to enable a plurality of electric discharges to be operated therebetween, the electrodes acting as the cathodes consisting of material adapted to support said discharges at incandescence while remaining substantially intact, a filling of material in said container having at the operating temperature a gaseous pressure high enough to cause said discharges to have the characteristics of electric arcs and means for starting said discharges individually and thereupon operating the discharges in series.

17. An electric device comprising a sealed container, at least three electrodes therein arranged to enable a plurality of electric discharges to be operated in series therebetween, the electrodes acting as cathodes consisting of tungsten, and a filling of material having at the operating temperature of said device a gaseous pressure of the order of atmospheric pressure.

18. An electric lamp comprising a sealed container, tungsten electrodes therein arranged to enable a plurality of arc-like discharges to be operated therebetween, a filling of material having at the operating temperature of said lamp a gaseous pressure of the order of atmospheric pressure, means for starting said discharges independently of each other and thereupon operating said discharges in series.

19. The combination of a device comprising a receptacle, a cathode therein consisting of material adapted to operate at incandescence, an anode, and a filling of material having at the operating temperature of the device a substantial gaseous pressure, a source of energy or current supply, a circuit connecting said source to said anode and cathode, and a second circuit supplying a heating current from said source to said cathode.

20. The combination of a device comprising a receptacle, a cathode of tungsten, an anode, and a gaseous filling, a source of energy or current supply, a circuit connecting said source to said cathode and anode, a second circuit independent of said anode for supplying heating current to said cathode, and a three-pole switch for completing both of said circuits.

21. In an improved arc lamp, a container, electrodes and a circuit connection therefor within said container, including a ballast or stabilizing means in series with said electrodes which is rendered incandescent by the arc forming current.

In witness whereof, I have hereunto set my hand this 17th day of September, 1914.

ERNST FRIEDERICH.

Witnesses:
HEINRICH D. WORNER,
HERMANN SCHRÖDER.

DISCLAIMER 1,393,520.—*Ernst Friederich*, Berlin, Germany. ENCLOSED ARC DEVICE AND THE METHOD OF STARTING THE SAME. Patent dated October 11, 1921. Disclaimer filed November 6, 1937, by the assignee, *General Electric Company*.
Hereby disclaims claims 1, 6, 8, and 14 of said Letters Patent.
[*Official Gazette November 30, 1937.*]